[54] TIME DIVISION MULTIPLEX BRANCH EXCHANGE

[75] Inventors: William Ralph Smith; Herman Deutsch, both of Raleigh, N.C.

[73] Assignee: Tele/Resources, Inc., White Plaines, N.J.

[22] Filed: Sept. 25, 1972

[21] Appl. No.: 291,960

[52] U.S. Cl. .......... 179/15 AT, 179/99, 179/15 AA

[51] Int. Cl. .......... H04j 3/12

[58] Field of Search ........ 179/15 A, 15 AA, 15 AT, 179/18 AD, 18 ES, 18 EC, 1 CN, 15 AN, 15 BW, 18 HB, 84 T, 99, 81 R, 81 C, 84 L

[56] References Cited

UNITED STATES PATENTS

| | | | |
|---|---|---|---|
| 3,060,265 | 10/1962 | Duncan | 179/18 BC |
| 3,281,538 | 10/1966 | Marding | 179/15 AN |
| 3,293,369 | 12/1966 | Schroeder | 179/15 AT |
| 3,303,287 | 2/1967 | Mauduech et al. | 179/15 AT |
| 3,319,005 | 5/1967 | Gaunt | 179/18 BC |
| 3,420,959 | 1/1969 | Hall | 179/15 AA |
| 3,420,961 | 1/1969 | Averill | 179/99 |
| 3,617,642 | 11/1971 | Aro | 179/15 AA |
| 3,617,643 | 11/1971 | Nordquist | 179/18 BC |
| 3,689,896 | 9/1972 | Dimmick | 179/15 AA |
| 3,715,508 | 2/1973 | Blasbalg | 179/15 AT |
| 3,757,053 | 9/1973 | Pell et al. | 179/15 AL |

*Primary Examiner*—Kathleen H. Claffy
*Assistant Examiner*—Thomas D'Amico
*Attorney, Agent, or Firm*—Sandoe, Hopgood & Calimafde

[57] ABSTRACT

A time division multiplex branch exchange includes a plurality of stations that have audio input and output capacity. A pair of receiving wires and a pair of transmitting wires are connected to each station. A plurality of receiving amplifiers and transmitting amplifiers are attached to the transmitting and receiving wires of each station, respectively. A summing means, which may include an amplifier, combines the inputs produced during each of a series of time slots which recur at a predetermined frequency. Input and output gates are connected to the receiving and transmitting amplifiers and to the summing means. Particular circuitry is described including a three input AND gate used for generating ring signals and a disconnect timer activated by the hookswitch to prevent the hookswitch from signalling a line holding condition.

4 Claims, 4 Drawing Figures

TIME DIVISION MULTIPLEX BRANCH EXCHANGE

BACKGROUND OF THE INVENTION

This invention relates to telephony systems, and more particularly to telephony systems including time division multiplex branch exchanges.

A conventional private branch exchange (PBX) makes the connection between a station and other stations and trunk lines participating in a call by the movement of crossbars or by other electro-mechanical switching arrangements. However, this type of PBX is costly and has high space requirements.

Numerous exchanges that use electronic switching have been proposed in an effort to improve upon conventional electro-mechanical arrangements. Some of these proposals have incorporated time division multiplexing while others have employed space division techniques.

In a time division exchange, a signal carried by a speech highway is divided into a series of recurring frames by an oscillator or other device running at a constant predetermined frequency. Each frame is divided into a series of time slots defined by the operation of gates. In most of these previously known systems, a pulse transmitted during a particular time slot is amplitude modulated to carry information relating to a conversation that has been assigned to that slot. It is a generally accepted principle that a signal must be sampled at twice the frequency of the highest frequency component to be transmitted.

Since there are many time slots in a frame, only a small part of a voice signal is sampled and transmitted. A technique which has been used in conventional time division systems to permit the exchange of a maximum quantity of energy during the short duration of a time slot when a path between communication stations or trunk lines is closed is called resonant transfer. According to this technique, each side of a conversation may be considered to be a two wire station. Each station is a transformer coupled to a resonant circuit which is connected to the speech highway. The resonant period of the circuit is twice the duration of a time slot. Thus when the path between the two stations is closed, the energy stored in their respective resonant circuits is interchanged. The path is then interrupted before the energy can be interchanged again.

Resonant transfer is not well suited to the use of integrated circuitry because it requires the use of inductors. Thus, the important advantages of integrated circuit construction have not been fully realized in prior art systems. Moreover, resonant transfer systems have low cross-talk immunity and require extensive filtering. Conventional resonant circuit techniques are compatible with conventional two wire systems rather than four wire systems. There are limits to the extent to which sidetones can be suppressed in two wire systems, without undue complexity. Two wire systems generally utilize voltages which are substantially above the voltage levels at which audio information is transmitted to control ringing and other such functions. However, the use of resonant transfer has been thought to be necessary, or at least desirable, because it increases the amount of energy transmitted and, therefore, reduces the need for amplification.

Although previously suggested time division multiplex automatic branch exchanges have advantages when compared to crossbar systems, these suggested exchanges have not reduced cost or embodied other advantages of sufficient importance to promote their use and acceptance on a wide commercial basis. Accordingly, there is a need for a new time division system, improved over the presently known resonant transfer systems, which will allow time division to be employed more effectively.

SUMMARY OF THE INVENTION

According to this invention, a new and improved telephony system includes a time division multiplex branch exchange. The system comprises a plurality of stations each of which has audio input and output capability. It is a four-wire system; each station is connected to a pair of transmitting conductors and a pair of receiving conductors. A plurality of transmitting amplifiers are arranged so that each receives an audio signal from one transmitting conductor pair, and a plurality of receiving amplifiers are arranged so that each supplies an audio signal to one receiving conductor pair.

A summing means is provided for combining inputs from one or more transmitting amplifiers and for producing an output in accordance with the sum of the inputs for supply to receiving amplifiers. A plurality of input gates selectively connect transmitting amplifiers to the input side of the summing means during a series of time slots recurring at the predetermined frequency. The closing and opening of these input gates defines time slots during which the inputs relating to a particular conversation is processed by the summing means. A plurality of output gates selectively connects the receiving amplifiers to the output side of the summing means when the appropriate time slots recurs.

This system is particularly well suited for the use of integrated circuit construction, thereby substantially reducing cost and space requirements. The use of four wires associated with each station permits the necessary supervision and control signals to be sent to those stations without exceeding the relatively low voltage at which the stations operate to exchange audio information while a conversation is in progress.

The four-wire construction of the system lends itself to the use of a unique means for eliminating sidetones. A portion of the signal originating from a particular station is phase-shifted substantially 180° and then added to the summed signal supplied to that station from its receiving amplifier. This cancels at least part of the signal originating from that station. The amount of cancellation depends upon the relative amplitude of the added out-of-phase signal. Preferably this amplitude is selected to give a suppression of approximately 8db.

The increased amplification capability within the system makes it possible to operate effectively and efficiently without employing resonant transfer. Thus, the elements of the system are arranged to form an improved combination which has important advantages compared to the construciton of prior art telephony systems designed to accomplish the same task.

BRIEF DESCRIPTION OF THE DRAWINGS

The above and other objects, features and advantages of the present invention are realized in a specific illustrative embodiment thereof, discussed in detail hereinbelow in conjunction with the accompanying drawings in which.

DESCRIPTION OF THE PREFERRED EMBODIMENT

The Station

Figure 1:
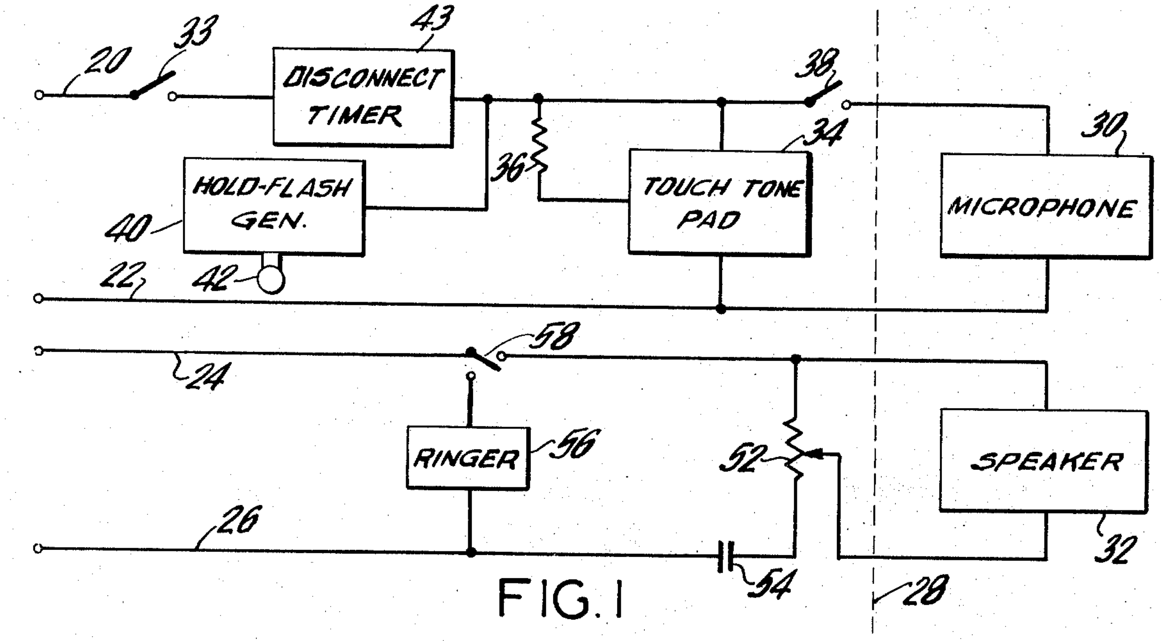
FIG. 1 shows the circuitry contained within an individual station of a telephony system constructed in accordance with the invention.

Each station used in the telephony system of this invention contains a printed circuit shown in FIG. 1 and is connected to the private branch exchange of the system by four conductors, a pair of transmitting conductors 20 and 22 and a pair of receiving conductors 24 and 26. These conductors 20, 22, 24 and 26 can be individual copper wires, or they can be formed by coaxial cables, each of which provides two conductors. The components of the station contained in the handset are shown to the right of the broken line 28. They include a carbon microphone 30 connected between the transmitting conductors 20 and 22 and a speaker 32 connected between the receiving conductors 24 and 26.

When the handset of a station is lifted, a hook switch 33 closes. This provides an indication that the station has gone off-hook by allowing current to flow through the transmitting wire pair 20, 22. There is a non-varying potential drop within a station when the handset is off-hook and there is no audio input to the microphone 30.

The station contains a conventional Touch Tone pad 34 by which tone signals are generated and sent to the PBX to indicate a desired interconnection with another station or trunk line through a common time slot. A rotary converter may be included in the PBX if the Touch Tone signal can not be processed by the external equipment to which the system is connected. The pad 34 is biased through a resistor 36. The microphone 30 is disconnected by a switch 38 when a key of the pad 34 is depressed. The station contains a hold-flash generator 40 connected to the conductor 20 by which a signal is sent to the PBX to indicate that a call is to be placed on hold. The hold-flash generator 40 is a solid state pulse generator that causes the transmit path through the wires 20 and 22 to be opened for a short predetermined interval of about 100 milliseconds each time a hold key 42 is depressed. This signal is used to indicate that a call is to be placed on hold. The pulse generator 40 and the button 42 could be eliminated and the hold signal could be sent manually by momentarily closing the hook switch 33, but the duration of the pulse is then not constant and the danger of an inadvertent disconnection arises. A disconnect timer 43 insures that the minimum on-hook interval exceeds the duration of a pulse generated by the hold-flash generator 42. This insures discrimination between hold and on-hook signals.

The receive path 24, 26 includes a hook switch 58 on the wire 24 similar to the hook switch 33 in the transmitted path 20,22. A potentiometer 52 is provided for adjustment of the speaker volume level. A blocking capacitor 54 serves as a high pass filter to block AC hum and DC signals. When the station is on-hook, an electronic ringer 56 is connected across the receive pair 24, 26 by the double-throw switch 58. The ringing current to the station thus bypasses the speaker 32, potentiometer 52, the blocking capacitor 54. The ringer 56 is actuated by a 12 volt potential placed across the receive path 24, 26. When the hand set is lifted, the switch 58 disconnects the ringer 56 and reconnects the speaker 32.

The aspects of the stations of this telephony system not illustrated in FIG. 1 and described above are of conventional construction.

The Station Operating and Anti-Sidetone Circuits

Figure 2:
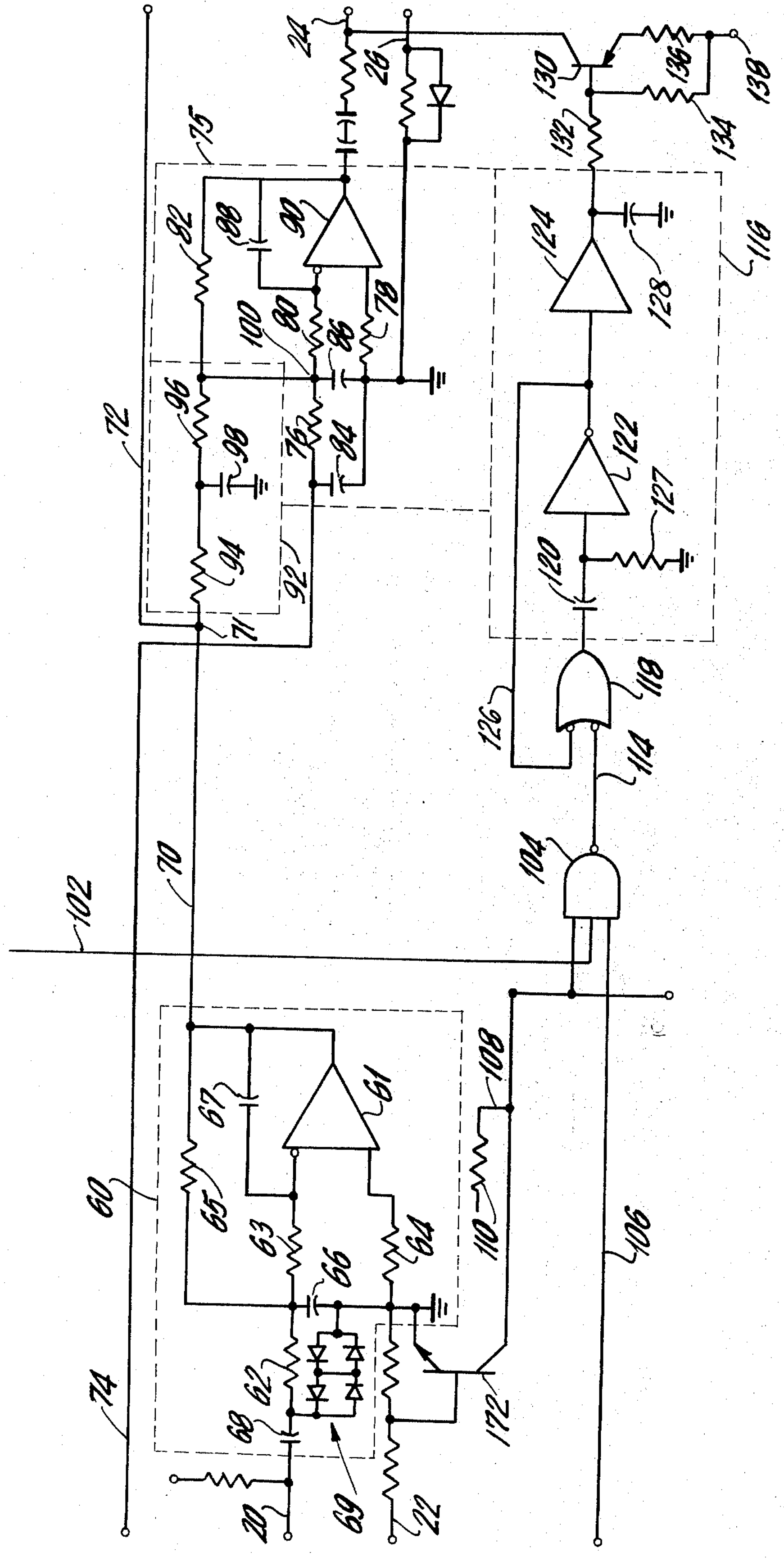
FIG. 2 shows the station operating and anti-sidetone circuits of a system constructed in accordance with the invention.

The output of each pair of transmitting conductors 20 and 22 is supplied to an active filter network 60, an example of which is shown in FIG. 2. Each network 60 includes a transmitting amplifier 61, a plurality of resistors 62, 63, 64 and 65, a plurality of capacitors 66, 67 and 68, and a limiter in the form of a diode bridge 69. The function of the network 60 is to shape the output of the station and to limit its band width and amplitude. The shaped signal from the network 60 is supplied by a lead 70 to a junction 71, from which it is carried by a lead 72 to an input gate of the time division switch (described in detail below) for distribution, within a selected time slot, to other stations or to exterior trunk lines.

The gated audio signal from the input gates of the time division switch which is to be supplied to the receiving wires 24 and 26 of FIG. 1 is fed to the lead 74 of the circuit of FIG. 2. This signal is inverted with respect to the signal in line 72 by an odd number of upstream summing amplifiers. It is processed by a filter network 75 including a plurality of resistors 76, 78, 80 and 82, a plurality of capacitors 84, 86 and 88, and a receiving amplifier 90. The resistor 76 and the capacitor 84 produce a phase shift of the inverted signal. The phase of the signal from the junction 71 is shifted by a network 92 consisting of two resistors 94 and 96 arranged in series and a capacitor 98 connected to the lead joining the resistors 94 and 96 and connected to ground. However, the signal from the junction 71 is not inverted.

The input signal from the time division switch supplied through the lead 74 contains the audio output signal from the station to which the receiving wires 24 and 26 (FIG. 1) are connected as well as the audio outputs of other stations involved in the same conversation. An anti-sidetone means, including the network 92, is provided for preventing that station from receiving its own signal at full strength. Accordingly, the inverted signal from the junction 71 is added to the gated audio input signal at a junction 100 of the amplifier 90. Since the phase shifts of these signals are equal but only one signal is inverted, the signals are 180° out of phase. If the signal from the junction 71 were of the same amplitude as the input from the lead 74 which originates from the receiving station connected to the conductors 24 and 26, it would completely cancel the signal from the lead 74. However, listeners generally prefer some residual sidetone, and therefore, it is preferable to provide a signal from the junction 71 that attenuates the sidetone to give a suppression of approximately 8 db.

Ring pulses are supplied during ringing period occuring at predetermined intervals by a line 102 to each of the circuits of FIG. 2, there being one such circuit for each station. Each line 102 is connected to an AND gate 104. A second input to the AND gate 104 is supplied by a line 106. Each line 106 is connected to only one circuit of the type shown in FIG. 2, and it carries a pulse only during a time slot assigned to a call in which the station is participating. A third input to AND gate 104 is derived from a lead 108 connected through a resistor 110 to a +5 volt source. The lead 108 is also connected to ground through a transistor 172. This transistor 172 is forward biased by signals carried by the transmitting conductor 22. Thus, when the station associated with the circuit of FIG. 2 is off-hook, the signal transmitted by the lead 108 is grounded through the transistor 172 and not supplied to the AND gate 104.

The AND gate 104 supplies output pulses through a lead 114 only if signals are supplied simultaneously through its three leads 102, 106 and 108. Thus, the ring pulse will arrive at lead 114 only if the station is on-hook (lead 108) and a signal indicating that the station is to be rung is present (lead 106). If the ring pulse is intended for a different station, it will not arrive during the time slot defined by the pulses supplied through lead 106.

The output of the AND gate 104 is supplied by the lead 114 to a pulse stretcher 116 which includes an AND gate 118, a capacitor 120, an inverter 122, and a voltage driver 124 arranged in series. The stretcher 116 is connected to ground by a resistor 127 and a capacitor 128. Part of the output of the inverter 122 is supplied as feedback to the AND gate 118 through a lead 126.

The output of the stretcher 116 is supplied to the base of a transistor 130 which is biased by three resistors 132, 134, and 136. When stretched ring pulses are supplied to the transistor 130, they close a path from a +12 volt input terminal 138 to the receiving conductor 24, thus actuating the electronic ringer 56 in accordance with the arrival of these pulses.

The circuit shown in FIG. 2 may readily be placed on a removable circuit card. Each card may contain the circuitry for one or more stations. The cards are centrally located within the exchange. The capacity of an exchange can be expanded by adding cards, and repairs can be made by replacing a defective card and transporting it to a remote repair facility. The need for on sight service is thus minimized.

The Input Gates

Figure 3:
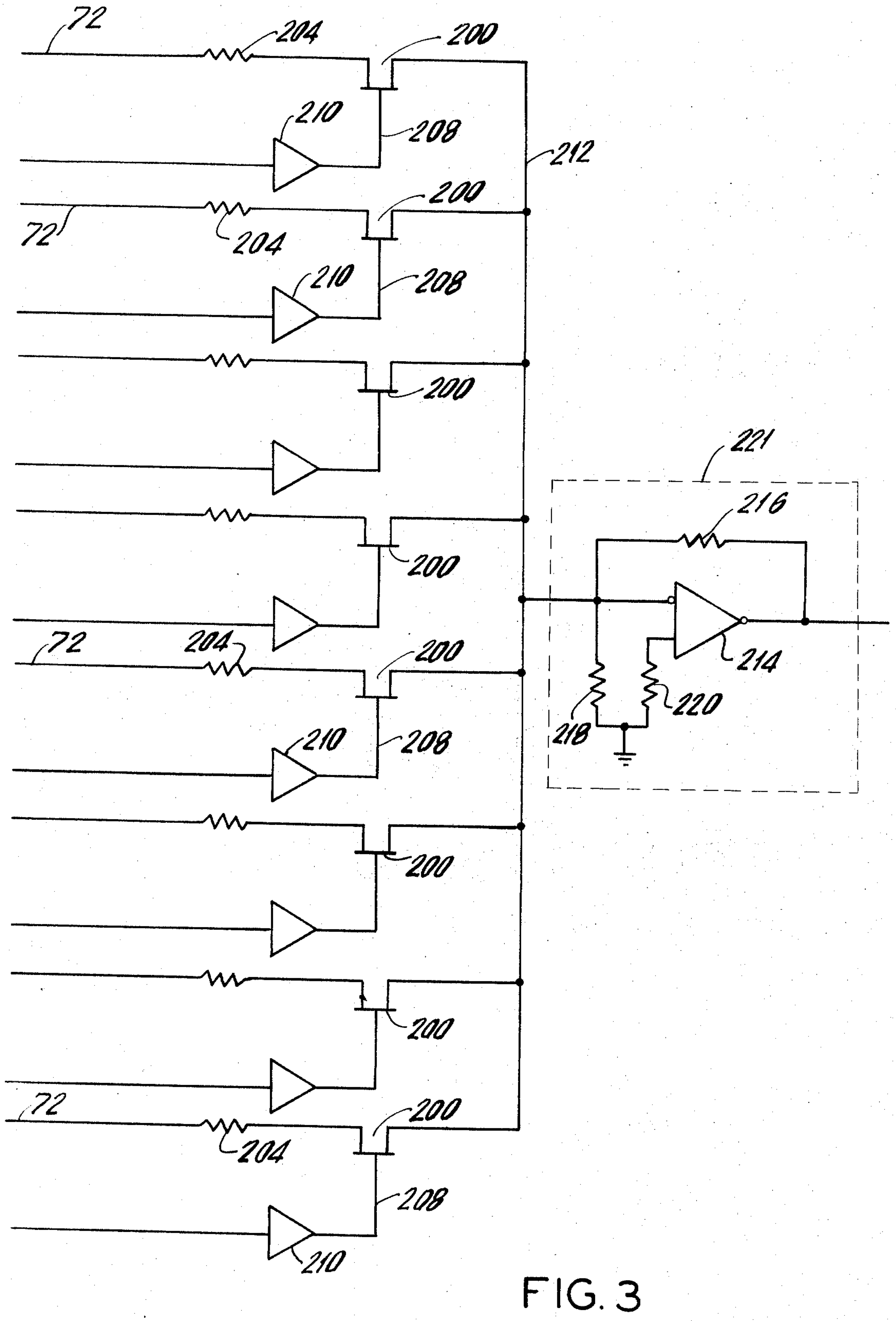
FIG. 3 shows a plurality of input gates used to selectively connect the stations of FIG. 1 to the speech highway of a system constructed in accordance with the invention.

FIG. 3 shows a block of eight input gates 200, each of which receives an audio input from one station. This is a shaped and limited input supplied by the lead 72 of one of the circuits shown in FIG. 2, there being one such circuit for each station. The outputs of the gates 200 are supplied to a summing means described below.

Before reaching a gate 200, the signal passes through a summing resistor 204 which is connected to lead 72. The gate 200 is a field effect transistor (FET) which is closed to permit the audio signal carried by the lead 72 (FIG. 2) to be fed to the summing means of the exchange when a control pulse is applied by a line 208. Before reaching the FET gate 200, the control pulse is converted to a predetermined level by a level converter 210. The control pulse is supplied through the line 208 at a predetermined frequency at which it is desired to sample the audio signal from the station. The closing and opening of an input gate 200 defines a time slot which recurs at a predetermined frequency. The pulses supplied to the lines 208 to operate the input gates 200 are of the same frequency and duration as the pulses supplied to the lines 106. In one system constructed in accordance with the invention, each gate 200 is operated by gate control pulses through the appropriate line 208 at a frequency of 12.5 KHz. A group of gates 200 are connected to supply their respective outputs to a common lead 212 and then to a high frequency amplifier 214 which is part of the summing means. Although a block of eight gates connected to a high frequency amplifier 214 is shown in FIG. 3, the number of gates in a block may, of course, be varied. In one system constructed in accordance with this description, 16 gates 200 are connected to each high frequency amplifier 214, and thirteen high frequency amplifiers 214 are connected to the downstream portion summing means (shown in FIG. 4 and described below).

The high frequency amplifier 214 is connected in parallel with a feedback resistor 216 and a second input is provided through two resistors 218 and 220 which are connected to ground. The gain of the amplifier 214 is determined by the values of the summing resistor 204 and the feedback resistor 216. These components all form the upstream portion 221 of the summing means 221. The downstream portion of the summing means is shown in FIG. 4.

The Summing Means and Output Gates

Figure 4:
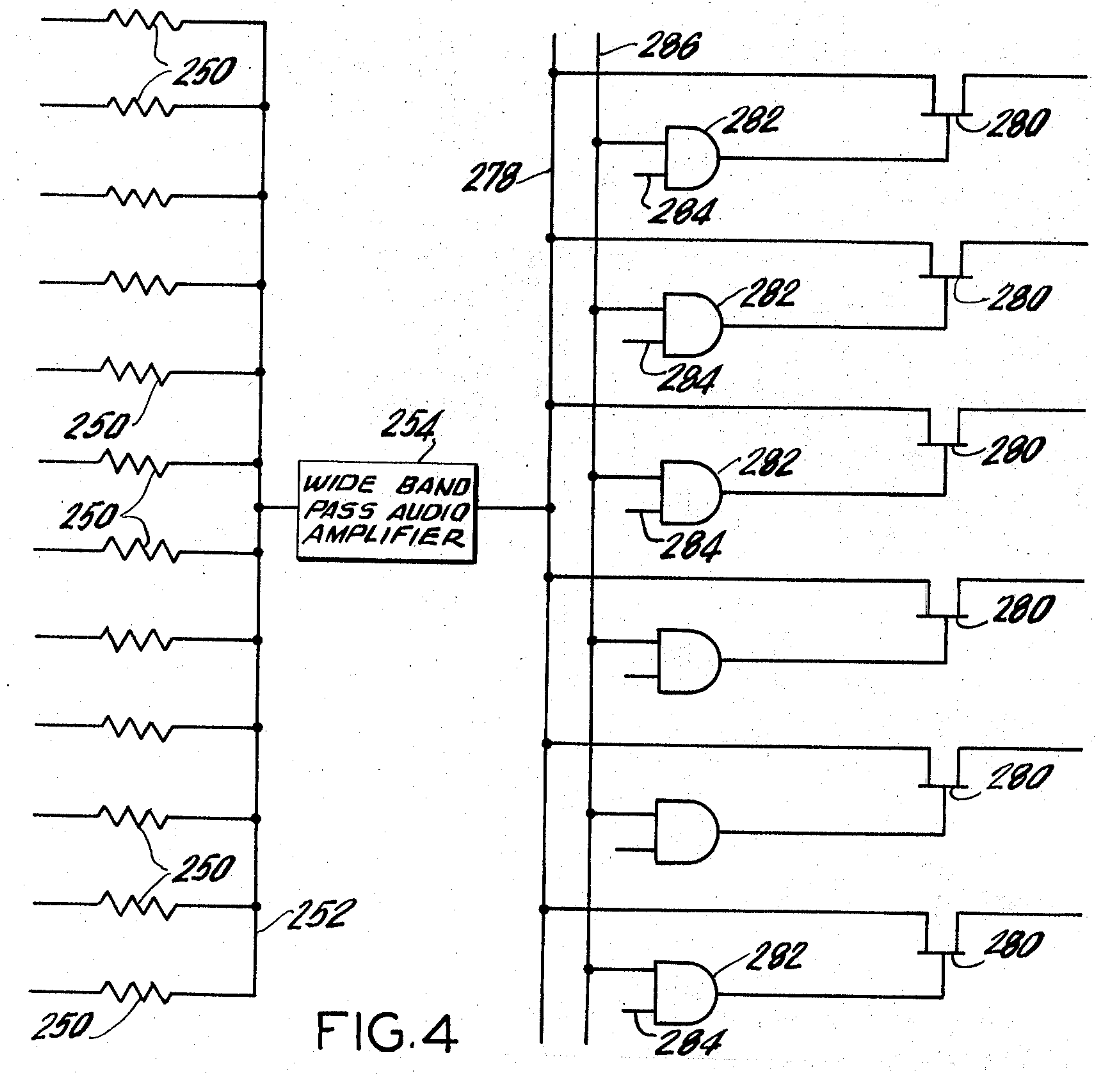
FIG. 4 shows the speech highway and output gates of a telephony system constructed in accordance with the invention.

FIG. 4 shows a further summing means in which a plurality of summing resistors 250 are arranged in parallel. Each of the resistors 250 receives the output of one of the amplifiers 214. The signals from the resistors 250 are combined on a common lead 252 and fed to a wide band-high slew rate amplifier 254 (also part of the summing means) which produces a composite signal containing information relating all time slots, i.e., all conversations taking place within the system. In one system that has been constructed in accordance with the invention, 32 time slots were used, 32 being an even binary number. Since each time slot was sampled at a rate of 12.5 KHz, the required band pass of the amplifier is 400 KHz. This is well within the capabilities of commonly available 500 KHz wide band amplifiers. The output of the main wideband amplifier 254 of the summing means is supplied via a common audio buss 278 to a plurality of output gates 280, each gate being an FET. Although only six output gates 280 are shown in FIG. 4, there is one such gate for each station in the system. Some gates 280 are associated with exterior trunk lines. A four-to-two wire adapter is then, generally, required.

The function of the summing means is thus to combine inputs consisting of energy produced during each selected time slot which recurs at a predetermined frequency and produce an output in accordance with the sum of these inputs. This is supplied to receiving conductors connected to the stations and exterior trunk lines that are participating in a particular call. There will, of course, generally be at least one station participating in each call. Conference calls can be arranged by interconnecting all participating stations and trunk lines in a single time slot.

The output gates 280 are closed by enabling pulses from a plurality of AND gates 282, there being one AND gate 282 for each output gate 280. These enabling pulses occur at the rate of one for each time slot. The output gate 280 associated with a particular station is rendered conductive only during the recurring time slot assigned to a call in which that station is participating. If the aforementioned system parameters are used, the enabling pulses occur at a frequency of 400KHz. They are, however, of shorter duration that the gate control pulses of the same frequency used to close and open the input gates 280 which define the time slots. This shorter duration causes the leading and trailing edges of the sample within each time slot to be trimmed, thus improving the quality of the signal. The means for trimming the samples is the AND gates 282.

The operation of the AND gates 282 takes place as follows. When a gate control pulse is supplied through one of the lines 208 to close an input gate 200 of a particular station, a pulse of the same duration is simultaneously supplied through a line 284 to the AND gate 282 which is associated with the output gate 280 of that same station. Each AND gate 282 also receives, through a common lead 286 connected to a second input terminal, a continuous series of trimming pulses which are of shorter duration than the pulses supplied through the leads 284. There is one trimming pulse supplied through the line 286 for each possible time slot. Since the AND gates 282 enable the output gates 280, the output gates are closed each time a pulse arrives through the corresponding line 284, but only for the duration of a trimming pulse.

The output gates 280 and their associated circuitry are, like the circuitry of FIGS. 2 and 3, of integrated circuit construction. The input and output gates 200 and 280 as well as the receiving and transmitting amplifiers 90 and 61 can be placed on circuit cards located at the PBX, remote from the individual stations which are distributed over an area such as an office.

Supervision and Control

The system of FIGS. 1 through 4 operates in cooperation with supervision and control circuitry which may be at least partially automatic. This circuitry must generate the control and trimming pulses to operate the input gates 200 and the output gates 280 in the proper sequence. Once the calls that are in progress have been assigned time slots, gate control signals can be generated in the proper sequence by a circulating memory. The trimming pulses supplied to the AND gates 284 through the leads 286 can be generated by an oscillator that is synchronized with the circulating memory. The assignment of time slots to individual conversations can be done by a human operator, or by automatic control equipment.

While the principles of the invention have been described in connection with specific apparatus, it is to be clearly understood that this description is made only by way of example and not as a limitation to the scope of the invention.

We claim:

1. A time division multiplex telephony system comprising a time division switch including a plurality of gates by which time slots are defined, a plurality of stations each having a microphone and a speaker, a set of four conductors including a transmitting pair and a receiving pair connecting each station to said time division switch, an electronic ringer connected across one of said pairs of conductors, hook switch means for interrupting the current flow through at least one of said conductors when said station is in an off-hook condition, a plurality of AND gate means one of which is associated with each station and remote therefrom for gating ring pulses to the associated station in response to the simultaneous occurrence of first, second and third inputs, means for periodically supplying said first input to all such AND gates simultaneously during periodically recurring ringing periods, means for supplying said second input to an individual AND gate when the station with which it is associated is to be rung, means for supplying said third input to an AND gate when the station with which it is associated is on-hook as indicated by said hook switch, and a plurality of pulse stretching means one of which is associated with each AND gate and station to lengthen the output thereof, each stretcher being connected by said conductors to the electronic ringer of the station associated therewith.

2. A time division multiplex telephony system comprising a time division switch including a plurality of gates by which time slots are defined, a set of four conductors including a transmitting pair and a receiving pair by which each station is connected to said time division switch, first means for indicating the occurrence of periodically recurring ringing periods to all stations simultaneously, second means for indicating to an individual station when it is desired to ring said station, third means including a hook switch connected to at least one pair of said conductors for indicating whether an individual station is off-hook, gate means connected to receive inputs from said first, second & third means for supplying ring pulses to a station in response to a predetermined combination of said inputs, and a ringer connected to said gate means by at least one of said conductors for producing an audible signal in response to said ring pulses.

3. The apparatus of claim 1, further comprising a pulse stretcher means connected between said gate means and said ringer for lengthening said ring pulses.

4. A time division multiplex telephony system comprising a time division switch including a plurality of gates by which time slots are defined and a plurality of stations each connected to the gates by four conductors including a transmitting pair, a receiving pair, hold-flash generator means for interrupting the current path through one of said pairs for a short predetermined interval, a hook switch connected in series with said hold flash generator means, and a disconnect timer means connected in series with said hold-flash generator means and said hook switch for causing interruptions of said current path initiated by said hook switch to have a minimum predetermined duration that exceeds said short interval of interruption predetermined by the hold-flash generator means.

* * * * *